(12) United States Patent
Chan et al.

(10) Patent No.: US 7,011,118 B2
(45) Date of Patent: Mar. 14, 2006

(54) RESIDENTIAL COMPRESSOR FOR REFUELING MOTOR VEHICLES THAT OPERATE ON GASEOUS FUELS

(75) Inventors: Anthony Chan, North York (CA); Filip Atanassov, Toronto (CA); Ralph Rackham, Toronto (CA); Tome Mojsov, Toronto (CA); Brian Chapnik, Thornhill (CA); Tracey Demaline, Georgetown (CA)

(73) Assignee: 2045951 Ontario Inc., Toronto (CA)

( * ) Notice: Subject to any disclaimer, the term of this patent is extended or adjusted under 35 U.S.C. 154(b) by 0 days.

(21) Appl. No.: 10/265,096

(22) Filed: Oct. 4, 2002

(65) Prior Publication Data

US 2004/0065676 A1    Apr. 8, 2004

(51) Int. Cl.
*B65B 1/04*    (2006.01)

(52) U.S. Cl. .............................. 141/98; 141/82; 141/95; 141/197

(58) Field of Classification Search .................. 141/18, 141/21, 69, 70, 82, 83, 94, 95, 98, 192, 197, 141/234, 236, 248; 62/50.1–50.5
See application file for complete search history.

(56) References Cited

U.S. PATENT DOCUMENTS

| | | | |
|---|---|---|---|
| 3,799,218 A * | 3/1974 | Douglass | 141/18 |
| 4,501,253 A | 2/1985 | Gerstmann et al. | |
| 4,531,558 A * | 7/1985 | Engel et al. | 141/44 |
| 4,624,390 A | 11/1986 | Palmer et al. | |
| 4,966,206 A | 10/1990 | Baumann et al. | |
| 5,029,622 A | 7/1991 | Mutter | |
| 5,263,826 A | 11/1993 | Baumann et al. | |
| 5,370,159 A | 12/1994 | Price | |
| 5,501,200 A | 3/1996 | Bogartz | |
| 5,653,269 A | 8/1997 | Magin et al. | |
| 6,117,211 A | 9/2000 | Chan et al. | |
| 6,360,793 B1 * | 3/2002 | Sugano et al. | 141/197 |

FOREIGN PATENT DOCUMENTS

| | | |
|---|---|---|
| CH | 676951 A | 3/1991 |
| DE | 198 59 423 C | 4/2000 |
| EP | 0 799 635 A | 10/1997 |
| WO | WO 01 788 72 A | 10/2001 |

* cited by examiner

Primary Examiner—Timothy L. Maust
(74) Attorney, Agent, or Firm—David J. French (57) ABSTRACT

A compressor for natural gas is made in a format suitable for mounting on a wall or upright support at a residential location to permit refilling of the gas reservoir of a gaseous-fueled motor vehicle parked at the residence. The wall-mounted appliance has vibration isolation supports to minimize transmission of noise into the residence. It has a ventilation and air circulation system that allows it to test for the presence of flammable gas both leaking from the appliance and present in the adjacent ambient environment, e.g. a garage. A motor speed control system permits operation of the appliance at speeds which are reduced when approaching the final pressure for the motor vehicle reservoir and at speeds which avoid the natural resonant frequencies of the system.

29 Claims, 8 Drawing Sheets

RESIDENTIAL COMPRESSOR FOR REFUELING MOTOR VEHICLES THAT OPERATE ON GASEOUS FUELS

FIELD OF THE INVENTION

This invention relates to a home refueling appliance for refueling motor vehicles that operate on gaseous fuels. In particular, it relates to a compressor that delivers high-pressure gas to the storage reservoir of gaseous fuel motor vehicles and monitoring and control elements that allow the appliance to operate in an unattended manner.

BACKGROUND TO THE INVENTION

Motor vehicles that operate on gaseous fuels, typically natural gas and hydrogen are refueled at stations that dispense gas at high pressure, typically 3000 pounds per square inch and higher. These refueling stations are generally of two types. The first type is either a public or private refueling station that is capable of refueling gaseous-fueled motor vehicles in about the same amount of time as is required to refuel a comparable gasoline-fueled motor vehicle.

The second type is a private refueling station that is more typically capable of refueling motor vehicles over a period of several hours, typically overnight.

To date, gaseous-fueled motor vehicles have not been an attractive option to private motor vehicle operators. Public natural gas refueling stations are too few and far between in most areas to meet private motor vehicle operators' expectations for refueling convenience. Private natural gas refueling stations have generally been too expensive to be attractive to private operators of one or two natural gas vehicles. Additionally, existing floor-mounted refueling compressors are bulky and inconvenient to install. Mainly for these reasons, the market for natural gas vehicles has been largely restricted to motor vehicle fleet operators.

One of the greatest barriers to the commercial introduction of hydrogen-powered motor vehicles is the virtually complete absence of hydrogen refueling stations and related infrastructure such as hydrogen production and transportation facilities. It will be several years before even limited hydrogen refueling infrastructure is available.

A need exists for a home refueling appliance to compress gas for refueling motor vehicles that is simple to install, operates with reduced noise and vibration levels that are comparable to other residential appliances, and which can be operated safely by untrained users. Such a system should be suitable for use in residences or other locations that have a standard electrical service and have natural gas service, a source of hydrogen, such as either a water electrolyser or natural gas reformer, or a source of another type of gaseous fuel. Preferably, such a home refueling appliance should have the capacity to fill the fuel reservoir of a typical gaseous fuel light duty vehicle in five to eight hours. The present invention addresses all of these objectives.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims, which conclude this Specification.

SUMMARY OF THE INVENTION

The invention relates to an appliance for refueling gaseous fuel motor vehicles while they are parked at a residence or other location where a vertical wall or upright support is available, such as may be present in a garage or carport. According to one aspect, the invention comprises:
1) a housing containing a multi-stage gas compressor, an electric motor that drives the compressors and an air cooling system:
2) an electrical cord to plug into a residential power supply, preferably at the normal, lower consumer voltage level;
3) a low pressure supply hose to connect the appliance to a source of gas;
4) a high-pressure discharge hose to deliver gaseous fuel under high pressure to a fuel storage reservoir such as may be present in a motor vehicle, and
5) monitoring and control elements that allow the appliance to operate in an unattended manner.

Wall Mounting

The home refueling appliance of the invention is preferably designed to be mounted either on a wall or a post support member or structure at about eye level. The unit should be mounted at least at a height that is above knee level, e.g., preferably above 18 inches from the ground, and more preferably, above the height of the hood of a standard passenger vehicle, eg. above 48 inches from the ground. This is to ensure that the appliance is clear of any areas were it might be run into by motor vehicles. The appliance can be wall-mounted either between wall studs, or flush against a flat wall through mounting brackets that are fastened to the upright support. Alternatively, the appliance can be post mounted on, for example, a carport post or a freestanding post, either indoors or outdoors, again through mounting brackets as required. Regardless of the mounting arrangement that is selected, the appliance is preferably light enough to be mounted by one person.

A spirally formatted discharge hose is provided that retracts when not extended for use. The force for such retraction may be provided either by the resilience of the hose spirals themselves or by supplemental means. By providing for retraction of the spirally formatted discharge hose in an upwards direction, collapsing the spirals of the hose until the entire hose and nozzle are beneath the wall-mounted housing of the appliance and optionally off the ground, a potential tripping hazard is eliminated and the hose and its associated coupling nozzle are removed from areas where they might be run over by a motor vehicle.

Vibration Isolation

Preferably, the electric motor and compressor are combined in a single assembly that is mounted in a housing through vibration isolators that dampen particularly higher frequency vibrations. The housing itself may be further mounted to its upright support means through low frequency isolators, such as helical or leaf springs or the like, that dampen low frequency vibration.

During start-up and normal operation of the home refueling appliance vibration is generated by the reciprocating movement of the compressor pistons and by the rotating mass of the shaft that drives the pistons. The reciprocating and rotating masses are dynamically unbalanced, which results in a dominant low frequency vibration of about 10 to 15 hertz during startup and low speed operation;—and a dominant high frequency vibration of about 30 to 35 hertz occurring during normal operation. The primary modes of vibration arise from reciprocating forces in the vertical plane and rotational reciprocating moments around a horizontal axis located at the approximate center of mass of the motor/compressor-assembly.

The home refueling appliance of the invention is preferably fitted with two stages of vibration absorption. This may include both high and low frequency vibration isolators that reduce the transmission of vibrations from the motor/compressor assembly, through the housing, and further through the mounting brackets into the wall, post or other upright support to which the unit is attached. This allows the appliance to be mounted on walls that separate a garage from living quarters while minimizing the amount of vibration and noise that is transmitted to the living quarters.

According to one feature of this aspect of the invention, a first stage of vibration isolators comprise flexible polymeric, e.g. rubber, mounts that preferably absorb higher frequency vibrations, e.g., frequency above about 10 to 15 hertz. Such mounts secure the motor/compressor assembly to the housing, preferably through the back panel of the housing, and are preferably located on either side of a horizontal plane passing approximately through the center of mass of the motor/compressor assembly such that the reciprocating moments which tend to cause a rocking motion directed towards and away from the wall will cause rotation about an axis formed by a straight line extending between the mounts. A damper means may also be included to absorb energy arising from such rocking vibrations. This damper may also be located between the back of the motor/compressor assembly and the back panel of the housing. In a preferred variant this damper means includes a rigid member in the approximate shape of a finger extending from the motor/compressor casing into a rubber-walled socket on the back panel of the housing that acts as a damping pot. By orienting this member in a direction that passes through the rotational axis extending between the mounts, the motion of the end of the member will be along an arc. This motion is resisted by the resilient fitting to dampen the vibration caused by the rotational reciprocating moments.

Low frequency isolators may be provided in the form of several, e.g. two,—helical springs that are placed between the support member and the housing, preferably through a bottom mounting bracket, and the bottom horizontal surface of the housing. The housing is preferably supported by such springs at the inside corners of the unit, along the wall-side or rearward edge of the bottom horizontal surface of the housing. The springs are mounted to dampen low frequency vibration both in the vertical plane and in respect of the low frequency vibration caused by the rotational reciprocating moments, suppressing their transmission to the support member. Preferably the low frequency isolators dampen frequencies below about 10 to 15 hertz.

Two further mounts, optionally of flexible polymeric material or in the form of helical springs or the equivalent that will dampen low, eg. below 10 to 15 hertz, frequency oscillation may then be located along the upper portion of the housing, either between the rear panel of the housing and an adjacent wall, or at a top-mounting bracket fitted to the support structure. The upper-mounted mounts retain the housing against falling away from the wall or support structure as well as dampening the residual vibration, including that caused by the rotational reciprocating moments.

By providing two consecutive vibration isolation means, mounted in series, with each of the isolation means adapted to dampen a respective frequency range, the transmission of vibration energy over a broader frequency range may be more efficiently suppressed.

Cooling and Ventilation System

The cooling and ventilation system for the refueling appliance comprises an air inlet, a fan and an air outlet to provide an air circulation zone around the unit for cooling and ventilation. By mounting the appliance at an elevated level, the fan will tend to mix and circulate air from the upper region of the adjacent environmental space, e.g. the top third of a room. Since natural gas, hydrogen and other flammable gases are lighter than air, any concentrations of such lighter than air flammable gases in the adjacent space will be found in the higher elevations of the space. By mixing and circulating the air, any flammable gas present in the room will be drawn into the appliance.

By arranging for the air to be circulated to enter from the bottom of the appliance and be exhausted near its top, it becomes practical to locate a flammable gas sensor in the airflow path, near the top of the appliance. A flammable gas sensor so positioned will then detect any gas that has escaped either from the compressor or, for example, from a motor vehicle parked in the surrounding environment. Thus both machine gas and room gas may be sampled by a single flammable gas sensor.

An air flow sensor may also be placed in the path of the re-circulating air, preferably at the base of the housing. Such a sensor may be coupled to the control system for the appliance, ensuring that the appliance will be shut off if, for some reason, there is an interruption in the flow of ventilation and cooling air.

Optionally, the ventilation exhaust may be either re-circulated within the adjacent space or directed outdoors, as through a wall-penetrating duct connected to the air outlet of the appliance.

Line Source Pressure Sensing

To prevent the introduction of air into the motor vehicle reservoir arising from the disconnection of the inlet hose of the unit from its gas source, the appliance incorporates an input line pressure sensing means that detects the coupling of the input connector to the gas line. This gas sensing means, as is previously known, can sense the absence of source gas pressure and provide a signal for the appliance to be shut off. Consequently, if the inlet hose is disconnected, the appliance will not inadvertently introduce compressed air into the motor vehicle's fuel reservoir.

This sensing means according to the invention also operates by sensing when the pressure of the inlet gas falls below a settable threshold pressure level. The threshold pressure is settable in order to allow the appliance to accommodate the requirements of different locations, e.g. in accordance with local line gas pressures or local regulations.

A need exists for sensing the actual source gas pressure level for the following reasons.

The inlet pressure from a domestic natural gas main is typically about one-quarter pound per square inch. This gas pressure may be needed to sustain pilot lights operating within a nearby residence. If the main gas supply system drops to a lower level, the added burden of the home refueling appliance may cause such pilot lights to go out. Consequently, the system is preferably provided with sensing means, which will detect when the source gas pressure falls below a pre-set, minimum pressure level, for example, one-eighth pound per square inch. As described above with respect to a total-disconnect situation, the source gas monitoring control elements will then either not allow the appliance to start up if it is shut down; or will shut down the appliance if it is running. This will prevent the appliance from sucking enough gas out of the domestic mains to extinguish the pilot lights of other domestic appliances.

Motor Drive Control

Location

A variable speed electrical motor is used to drive the multi-stage compressor. According to the invention a variable speed electronic motor controller, which supplies current to the electrical motor, is preferably located within the totally contained environment of the motor/compressor assembly. This sealed environment is provided by the metal casing that surrounds the motor and compressor parts.

Optionally, this motor controller circuitry may share the space provided as a blow-down volume for the high pressure gas remaining in the discharge line after refueling of a motor vehicle is complete, such a blow-down volume may be located within the sealed casing of the motor/compressor assembly. By locating the motor controller intimately proximate to the motor, within the casing surrounding the motor/compressor assembly, electromagnetic emissions, which may either be sent out or received by the controller, are minimized. Further, the wall of the casing may serve as a convenient heat sink for the heat produced by the motor controller, absorbing heat due to its mass and the fact that it can be made of a relatively high-heat-conducting metal, e.g. aluminum.

Speed Control Protocol

On startup, low motor speeds are adopted to reduce otherwise high start-up current drains on the electrical supply system. This enables the unit to operate off of a standard household voltage, e.g. 110–120 volt, moderately fused electrical supply system. After startup, initial compression can be effected with a high motor speed. Once higher pressures have been established in the motor vehicle fuel reservoir by the final output stage of the compressor system, according to the invention motor speed is reduced in order to moderate ring wear. This procedure is adopted based on the finding that the wear rate of the sealing rings within the compressor cylinders increases when the compressor system is operated at high speed against a high-back pressure.

Resonance

The speed of the electric motor is also controlled to avoid natural resonant frequencies arising from its mechanical components that would otherwise increase the noise and vibration generated by the unit.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
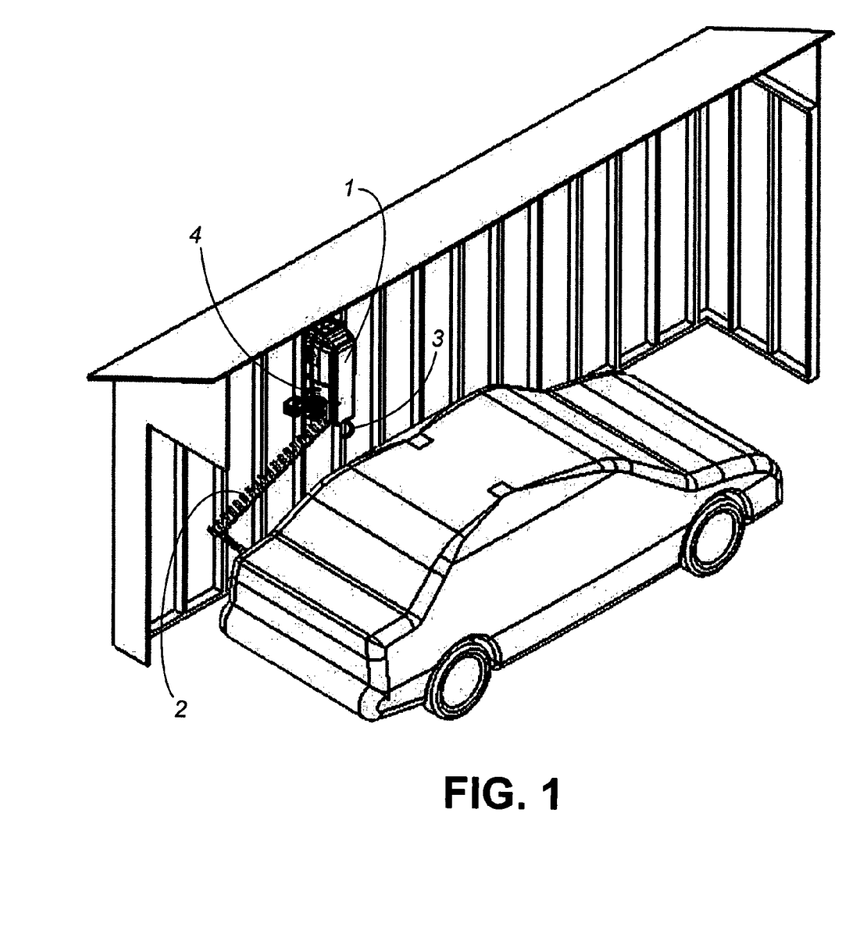
FIG. 1 is a pictorial representation of a gaseous fuel motor vehicle parked in a garage having a home refueling appliance according to the invention mounted on its inner wall.

In FIG. 1 the home refueling appliance 1 is shown mounted on a garage wall with the high-pressure discharge hose 2 connected to a car, the inlet hose 3 connected to a source of gas, and the electrical cord 4 plugged into a standard household receptacle.

Figure 2:
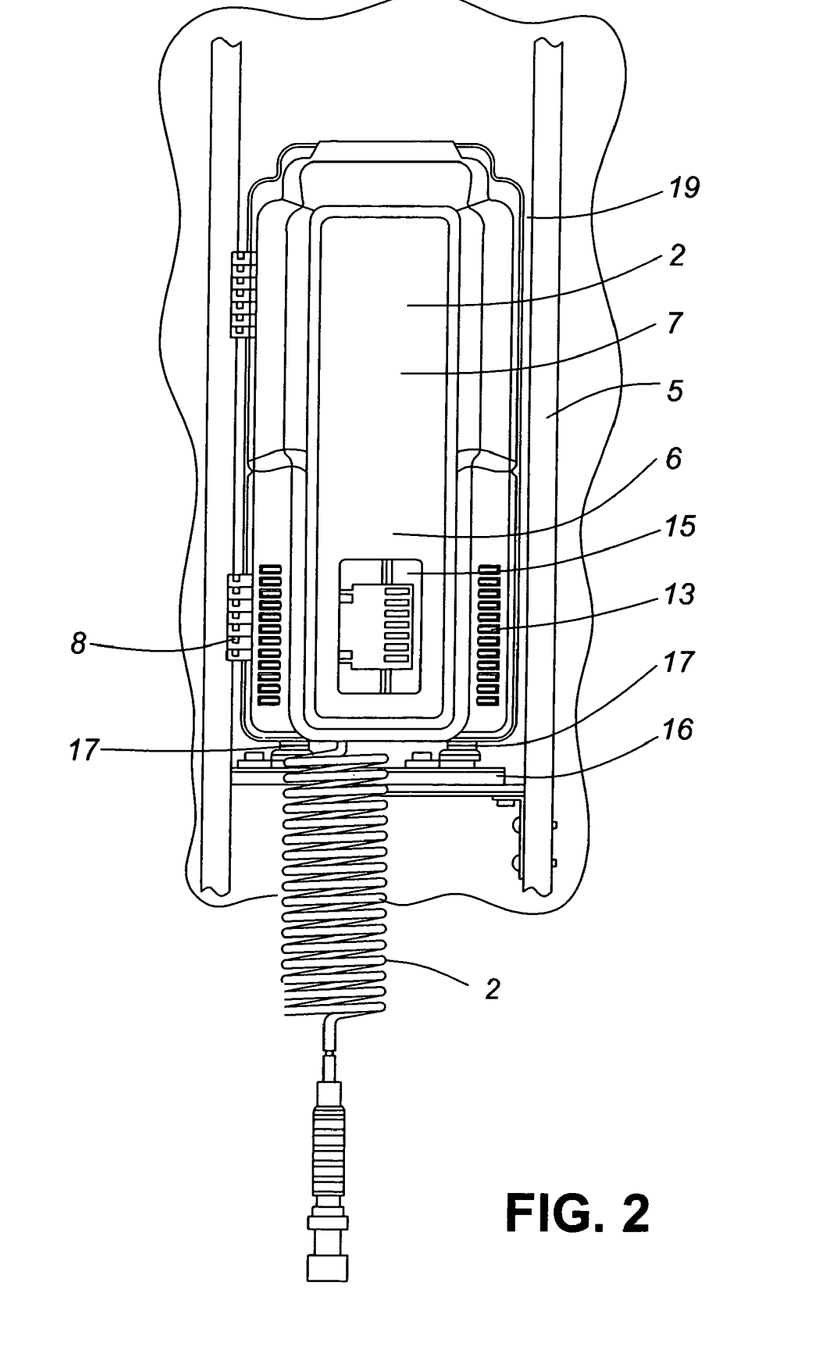
FIG. 2 is a face view of the appliance of FIG. 1 in its housing with the front access cover to the unit closed and showing the user control and display panel and the bottom-side spring supports for the unit.
Figure 3A:
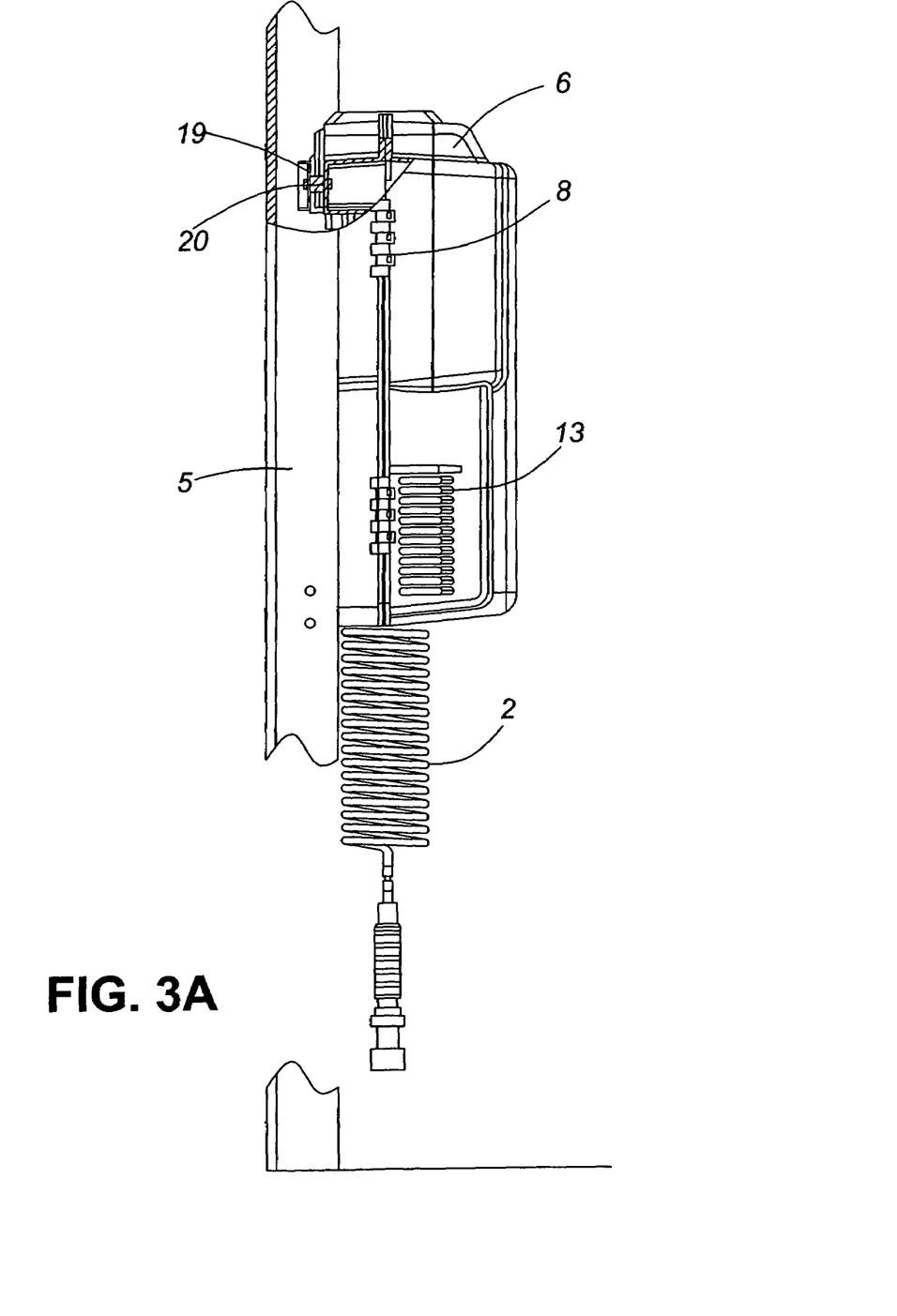
FIG. 3a is a side view of the appliance of FIG. 1 showing the discharge hose in its fully retracted position.
Figure 3B:
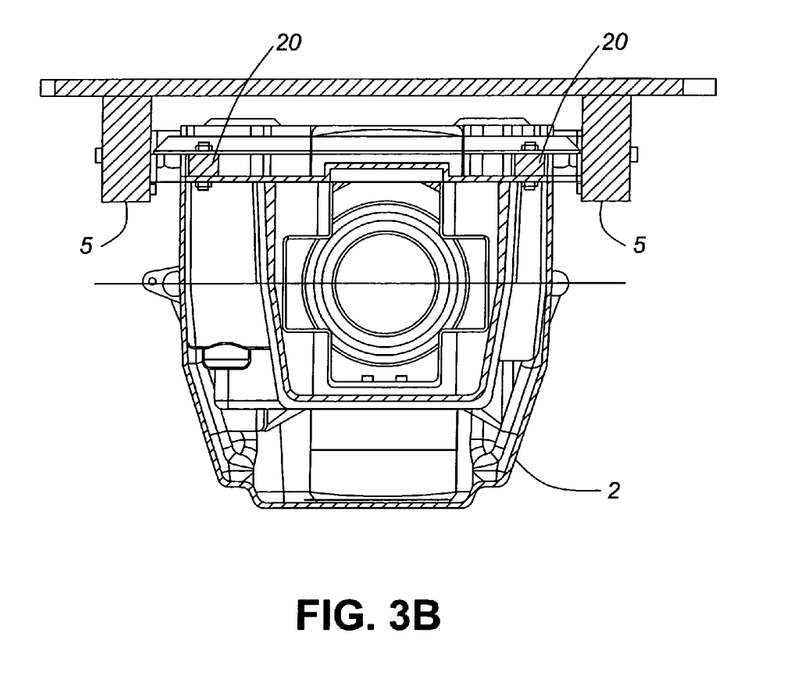
FIG. 3b is a cutaway plan view of the appliance of FIG. 2 showing the rubber isolation mounts along the back panel of the housing.

FIG. 2 is a face view of the appliance in its housing 7 mounted between wall studs 5 with the front access cover 6 closed and the high pressure discharge hose 2 in the fully retracted position. The front access cover 6 is secured to the back panel of the housing 7, shown in FIG. 6, by hinges 8. Air inlet vents 13 are located at the bottom of the front access cover 6, beneath the motor/compressor assembly. A control and display panel 15 is located on the front access cover 6, between the air inlet vents 13. The housing mounting hardware consists of a lower mounting bracket 16, helical springs 17, an upper mounting bracket 19, and polymeric isolators 20 shown in FIG. 3b. The helical springs 17 and polymeric isolators 20 suppress the transmission of vibration, preferably those occurring below about 10 to 15 hertz, from the housing of the appliance through the mounting brackets 16 and 19 and into the wall studs 5.

Figure 4:
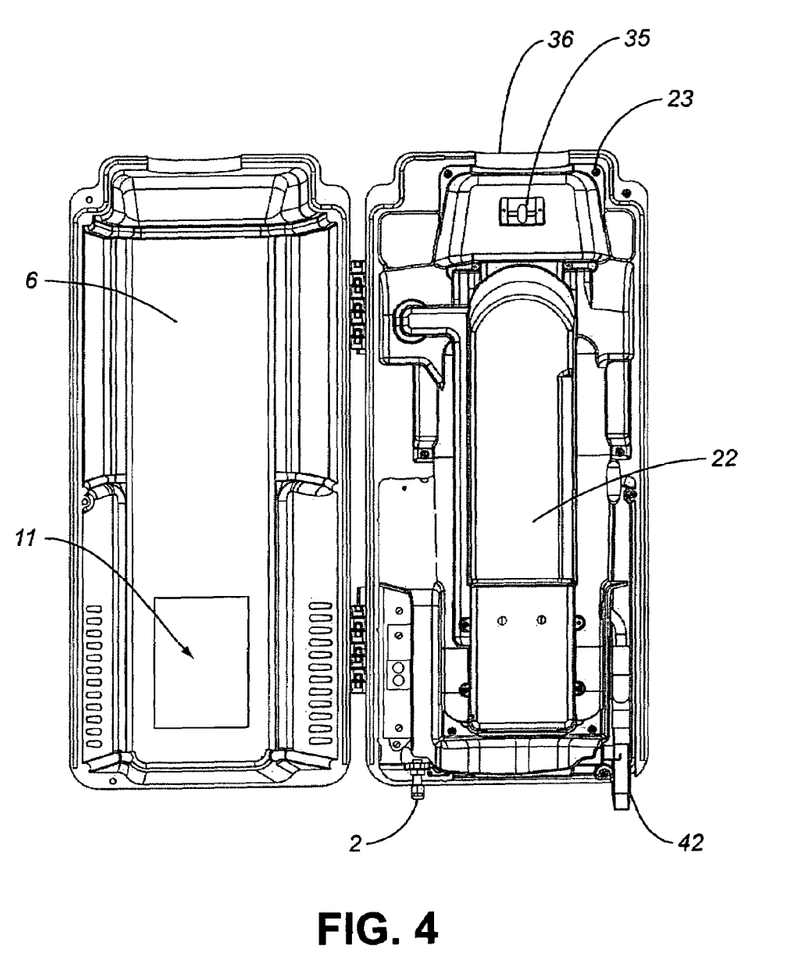
FIG. 4 is a face view of the appliance with the front access cover opened, exposing the ventilation cowling.
Figure 5:
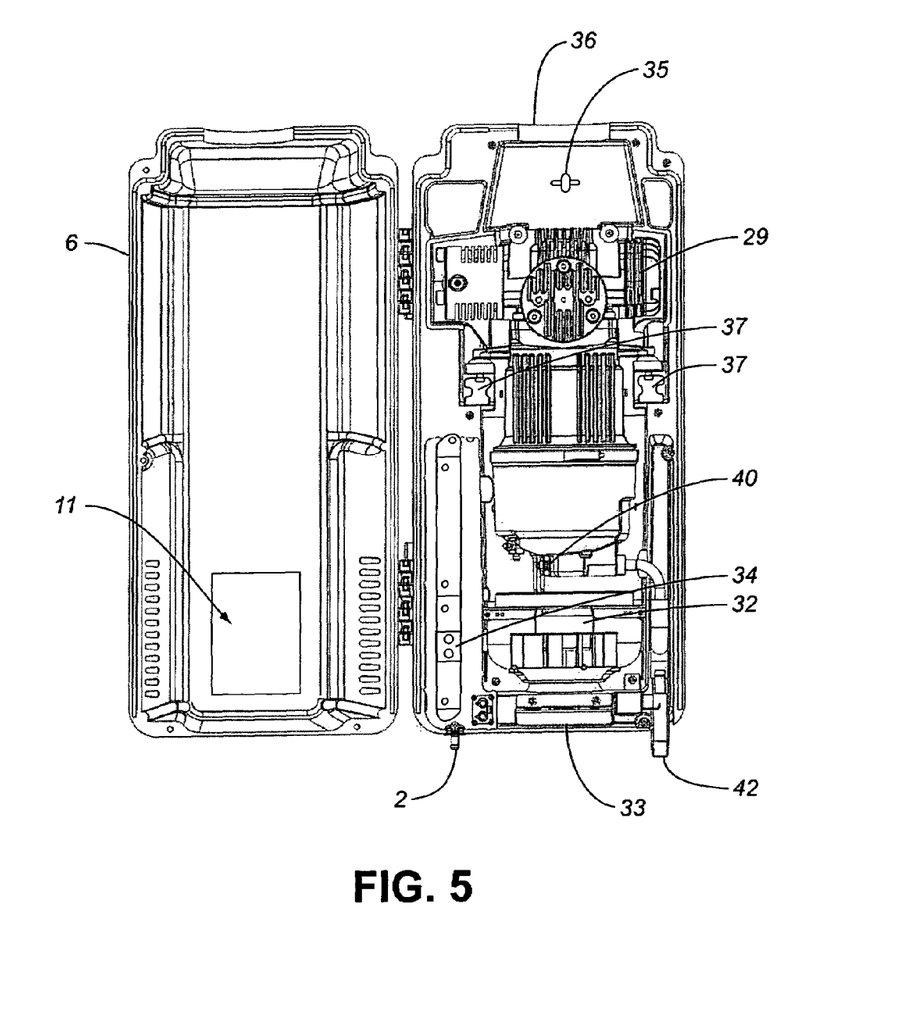
FIG. 5 is the face view of the unit of FIG. 4 with the cowling removed, showing the compressor/motor assembly in its casing, the housing-connecting mounts for this assembly, and the ventilation fan.

Referring to FIGS. 4 and 5, a cowling 22 is attached to the back panel of the housing 7 by screws 23. The back panel of the housing 7 and the cowling 22 form a ventilation enclosure for the compressor 29, the compressor motor 30, the blow-down volume 31, the air motor/fan assembly 32 and ancillary components shown in FIG. 5. The motor/fan assembly 32 draws cooling air through the intake duct 33, past the air flow sensor 34, and circulates the air over the air motor/fan assembly 32, the casing 12 containing: blow-down volume 31, compressor motor 30, compressor 29; as well as other components within the enclosure formed by the back panel of the housing 7 and the cowling 22. Air on leaving this ventilation enclosure passes by the flammable gas sensor 35, shown in FIG. 6, and out through the exhaust duct 36. All sensors are connected to a central computer-circuit based main controller 11.

As shown by the connections in FIG. 7, if either the air flow sensor 34 indicates that the cooling air flow is below a pre-set minimum limit or that the flammable gas sensor 35 detects the presence of a flammable gas in the cooling air, the central controller 11 ensures that the appliance 1 will not start up if it is already shut down; or will shut down if it is running.

The motor/compressor assembly in casing 12 is secured to the back panel of the housing 7 by two polymeric mounts 37, shown in FIG. 5. The casing 12 is further connected to a polymeric damper 39, shown in FIG. 6. The mounts 37 are located about the approximate center of mass of the motor/compressor assembly, along a horizontal line that passes along a horizontal plane that passes approximately through such center of mass. The two polymeric mounts 37 and the polymeric damper 39 preferably suppress the transmission of vibrations of above about 10 to 15 hertz, and particularly vibrations of around 30 to 35 hertz, which occur over the normal operating range of the appliance, minimizing the transfer of such vibration from the motor/compressor assembly to the back panel of the housing 7.

Referring to FIG. 5, a pressure sensor 40 connected to the low-pressure fuel gas inlet line 42 is connected electrically to the main controller 11. If the pressure sensor 40 sends a signal to controller 11 that a gas pressure condition below a pre-set limit is being sensed, the controller 11 ensures that the appliance 1 will not start up if it is already shut down; or will shut it down if it is running.

Figure 6:
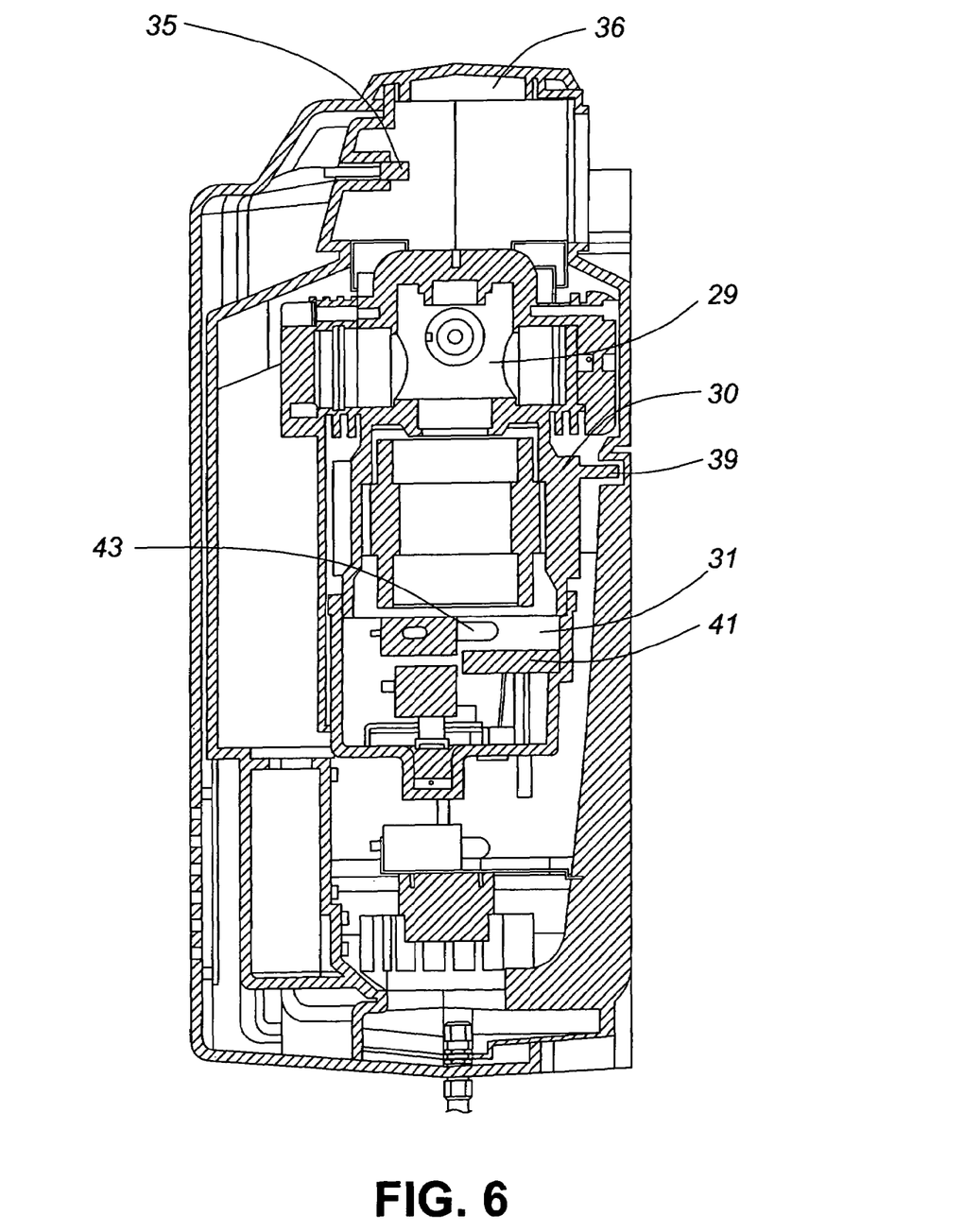
FIG. 6 is a partial cutaway view of the compressor/motor assembly with its blow-down volume that also contains motor control circuitry.

Referring to FIG. 6, the motor controller circuitry 41 is located within the casing 12, in the blow-down volume 31. The wall of the casing 12 acts as heat sink for the heat produced by the motor controller circuitry 41 and as a shield for incoming and outgoing electromagnetic emissions.

Figure 7:
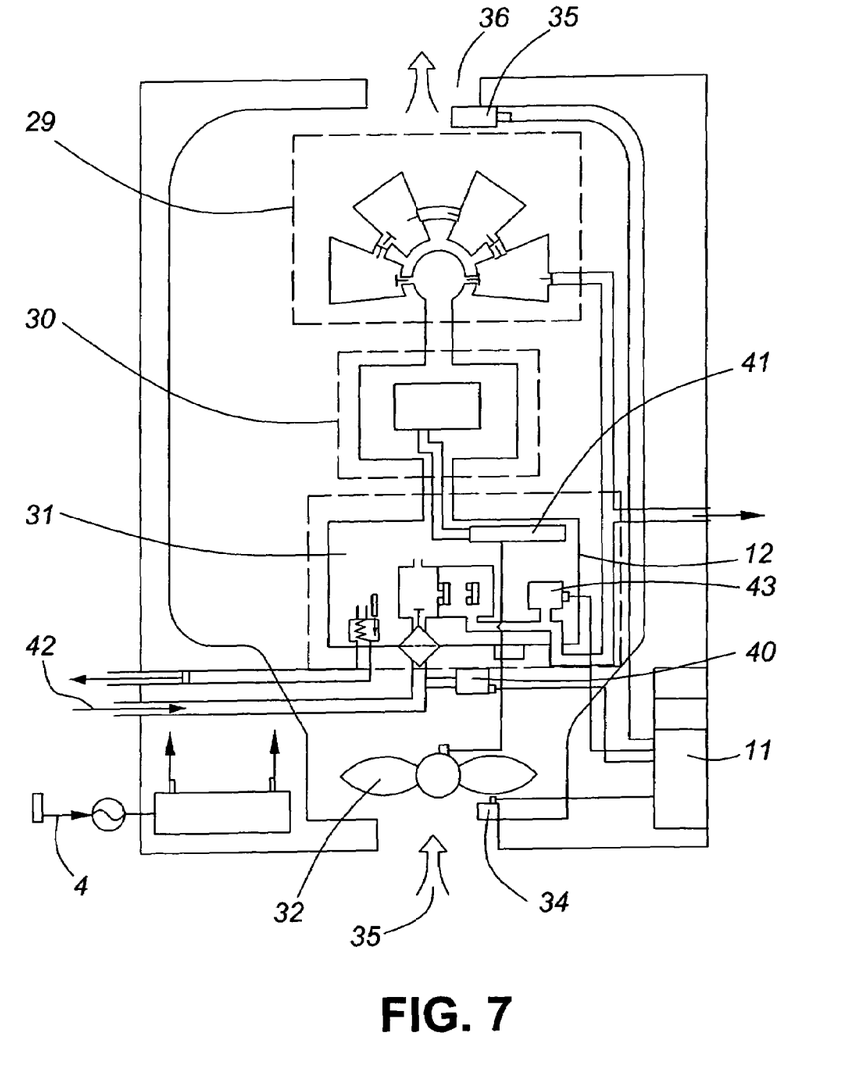
FIG. 7 is a schematic for the basic flow diagram of the appliance showing the main controller, the motor controller and various sensors.

As shown in FIG. 7, the main controller 11 is connected to receive signals from gas flow sensor 34, flammable gas sensor 35, source gas pressure sensor 4 as well as from the manual inputs on the control and display panel 15 and other sources such as the high pressure outlet gas sensor 43. The main controller 11 is able to activate the motor 30 and govern its speed through motor controller 22 in accordance with the conditions previously described.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as followed:

1. An appliance for refueling gaseous fuel motor vehicles while they are parked at a residence or other location where an upright support is available, such as may be present in a garage or carport comprising:
   a) a housing containing a motor/compressor assembly in the form of a multi-stage gas compressor and an electric motor that drives the multistage compressor, said compressor and motor being contained in a common, sealed casing;
   b) an air cooling system:
   c) an electrical connection means for connection of the motor to a power supply;
   d) a low pressure supply hose to connect the appliance to a source of gas provided by a gas supply line;
   e) a high-pressure discharge hose to deliver gaseous fuel under high pressure to a fuel storage reservoir such as may be present in a motor vehicle, and
   f) monitoring and control elements that allow the appliance to operate in an unattended manner,
in combination with an upright support
   wherein said appliance is provided with mounting means adapted to allow the appliance to be mounted on said upright support and wherein said appliance is mounted on said upright support at a height that is above 18 inches from the ground.

2. An appliance as in claim 1 wherein said upright support comprises wall studs and further comprising at least one lower support bracket spanning between and fastened to said wall studs upon which the appliance is mounted.

3. An appliance as in claim 1 wherein the discharge hose is a spirally formatted hose provided with retraction means to cause such hose to resiliently contract towards a compact assembly of spirals, drawing upon the hose until the entire hose is beneath said appliance.

4. An appliance as in claim 1 comprising first vibration isolation means positioned to reduce the transmission of vibrations arising from the motor/compressor assembly into the housing, said first isolation means comprising flexible mounts positioned on either side of the appliance within a horizontal plane passing approximately through the center of mass of the motor/compressor assembly, along a horizontal axis formed by a straight line extending between the mounts to secure the motor/compressor assembly to the housing.

5. An appliance as in claim 4 wherein said mounts are polymeric mounts that preferably absorb higher frequency vibrations above about 10 to 15 hertz.

6. An appliance as in claim 4 wherein the motor/compressor assembly is mounted on said flexible mounts so that it can rotate about said axis and comprising a damper means extending between the motor/compressor assembly and the housing to absorb vibrational energy arising from rotation of the motor/compressor assembly about said axis.

7. An appliance as in claim 4 comprising second vibration isolation means positioned for extending between said housing and said upright support.

8. An appliance as in claim 1 comprising first, higher and second, lower vibration isolation means to dampen respectively higher frequency vibrations and lower frequency vibrations and thereby reduce the transmission of vibrations from the appliance to the upright support to which the housing is attached, said higher vibration isolation means being mounted between said casing and said housing, and said lower vibration isolation means being mounted between said housing and upright support.

9. An appliance as in claim 8 wherein said lower vibration isolation means comprises helical spring means that are placed between the housing and said upright support and which dampen vibrations occurring at below about 10 to 15 hertz.

10. An appliance as in claim 9 further comprising vibration isolation means in the form of flexible, polymeric mounting means that are placed between the housing and upright support.

11. An appliance as in claim 8 wherein said motor/compressor assembly may rotate about a horizontal axis and further comprising a damper means extending between the motor/compressor assembly and the housing to absorb vibrational energy arising from rotation of the motor/compressor assembly about said axis.

12. An appliance as in claim 1 comprising a cooling and ventilation system wherein:
   i) the housing includes an air inlet, a fan and an air outlet to provide an air circulation zone around the motor/compressor assembly; and ii) a flammable gas sensor is positioned proximate to the air outlet to detect flammable gas passing through the cooling and ventilation system, wherein said appliance is mounted on said upright support at a height that is above 18 inches from the around whereby the fan will draw air from the adjacent environmental space and the flammable gas sensor will detect flammable gas that has escaped either from the motor/compressor assembly or is present in the adjacent environmental space.

13. An appliance as in claim 12 comprising a cowling mounted over the motor/compressor assembly to confine the air circulating around said motor/compressor assembly and direct circulating air pasts the flammable gas sensor adjacent the air outlet.

14. An appliance as in claim 1 wherein said appliance is mounted at a height that is above 48 inches from the ground.

15. An appliance as in claim 12 wherein said appliance is mounted at a height that is above 48 inches from the ground.

16. An appliance for filling a storage reservoir with gaseous fuel, comprising:
    a) a sealed and thermally conducting casing, the casing being capable of functioning as a heat sink, the casing containing at least:
        i) a multi-stage compressor for compressing the gaseous fuel;
        ii) a variable speed electric motor; and
        iii) a motor controller for controlling the motor, the motor controller being thermally coupled to the casing;
    b) means for providing a cooling and ventilation air flow along an air flow path around the casing;
    c) means for detection of flammable gas positioned in the air flow path; and
    d) a housing for housing items a) to c);
in combination with an upright support,
    the appliance being mounted above ground on said upright mounting support.

17. An appliance as in claim 16 wherein said appliance is mounted at a height that is above 48 inches from the ground.

18. An appliance according to claim 16 further comprising:
    e) a first vibration isolation means mounting the casing in a first vibration isolation relation to the housing; and
    f) a second vibration isolation means positioned for mounting the housing in a second vibration isolation relation to a mounting support.

19. An appliance for refueling gaseous fuel motor vehicles while they are parked at a residence or other location where an upright support is available, such as may be present in a garage or carport comprising:
    a) a housing containing a motor/compressor assembly in the form of a multi-stage gas compressor and an electric motor that drives the multistage compressor, said compressor and motor being contained in a common, sealed casing;
    b) an air cooling system:
    c) an electrical connection means for connection of the motor to a power supply;
    d) a low pressure supply hose to connect the appliance to a source of gas provided by a gas supply line;
    e) a high-pressure discharge hose to deliver gaseous fuel under high pressure to a fuel storage reservoir such as may be present in a motor vehicle, and
    f) monitoring and control elements that allow the appliance to operate in an unattended manner,
in combination with an upright support
wherein said appliance is provided with mounting means adapted to allow the appliance to be mounted on s aid upright support and wherein said appliance is mounted on said upright support at a height that is above 18 inches from the ground, said upright support comprising wall studs and further comprising at least one lower support bracket spanning between and fastened to said wall studs upon which the appliance is mounted.

20. An appliance for refueling gaseous fuel motor vehicles while they are parked at a residence or other location where an upright support is available, such as may be present in a garage or carport comprising:
    a) a housing containing a motor/compressor assembly in the form of a multi-stage gas compressor and an electric motor that drives the multistage compressor, said compressor and motor being contained in a common, sealed casing;
    b) an air cooling system:
    c) an electrical connection means for connection of the motor to a power supply;
    d) a low pressure supply hose to connect the appliance to a source of gas provided by a gas supply line;
    e) a high-pressure discharge hose to deliver gaseous fuel under high pressure to a fuel storage reservoir such as may be present in a motor vehicle, and
    f) monitoring and control elements that allow the appliance to operate in an unattended manner,
in combination with an upright support
wherein said appliance is provided with mounting means adapted to allow the appliance to be mounted on said upright support and wherein said appliance is mounted on said upright support at a height that is above 18 inches from the ground and
wherein the discharge hose is a spirally formatted hose provided with retraction means to cause such hose to resiliently contact towards a compact assembly of spirals, drawing upon the hose until the entire hose is beneath said appliance.

21. An appliance for refueling gaseous fuel motor vehicles while they are parked at a residence or other location where an upright support is available, such as may be present in a garage or carport comprising:
    a) a housing containing a motor/compressor assembly in the form of a multi-stage gas compressor and an electric motor that drives the multistage compressor, said compressor and motor being contained in a common, sealed casing;
    b) an air cooling system:
    c) an electrical connection means for connection of the motor to a power supply;
    d) a low pressure supply hose to connect the appliance to a source of gas provided by a gas supply line;
    e) a high-pressure discharge hose to deliver gaseous fuel under high pressure to a fuel storage reservoir such as may be present in a motor vehicle, and
    f) monitoring and control elements that allow the appliance to operate in an unattended manner,
in combination with an upright support
wherein said appliance is provided with mounting means adapted to allow the appliance to be mounted on said upright support and wherein said appliance is mounted on said upright support at a height that is above 18 inches from the ground and comprising first vibration isolation means positioned to reduce the transmission of vibrations arising from the motor/compressor assembly into the housing, said first isolation means comprising flexible mounts positioned on either side of the appliance within a horizontal plane passing approximately through the center of mass of the motor/compressor assembly, along a horizontal axis formed by a straight line extending between the mounts to secure the motor/compressor assembly to the housing.

22. An appliance as in claim 21 wherein said mounts are polymeric mounts that preferably absorb higher frequency vibrations above about 10 to 15 hertz.

23. An appliance as in claim 21 wherein the motor/compressor assembly is mounted on said flexible mounts so that it can rotate about said axis and comprising a damper means extending between the motor/compressor assembly and the housing to absorb vibrational energy arising from rotation of the motor/compressor assembly about said axis.

24. An appliance as in claim 21 comprising second vibration isolation means positioned for extending between said housing and said upright support.

25. An appliance for refueling gaseous fuel motor vehicles while they are parked at a residence or other location where an upright support is available, such as may be present in a garage or carport comprising:
   a) a housing containing a motor/compressor assembly in the form of a multi-stage gas compressor and an electric motor that drives the multistage compressor, said compressor and motor being contained in a common, sealed casing;
   b) an air cooling system:
   c) an electrical connection means for connection of the motor to a power supply;
   d) a low pressure supply hose to connect the appliance to a source of gas provided by a gas supply line;
   e) a high-pressure discharge hose to deliver gaseous fuel under high pressure to a fuel storage reservoir such as may be present in a motor vehicle, and
   f) monitoring and control elements that allow the appliance to operate in an unattended manner,
in combination with an upright support
wherein said appliance is provided with mounting means adapted to allow the appliance to be mounted on said upright support and wherein said appliance is mounted on said upright support at a height that is above 18 inches from the ground and
comprising first, higher and second, lower vibration isolation means to dampen respectively higher frequency vibrations and lower frequency vibrations and thereby reduce the transmission of vibrations from the appliance to the upright support to which the housing is attached, said higher vibration isolation means being mounted between said casing and said housing, and said lower vibration isolation means being mounted between said housing and upright support.

26. An appliance as in claim 25 wherein said lower vibration isolation means comprises helical spring means that are placed between the housing and said upright support and which dampen vibrations occurring at below about 10 to 15 hertz.

27. An appliance as in claim 26 further comprising vibration isolation means in the form of flexible, polymeric mounting means that are placed between the housing and upright support.

28. An appliance as in claim 25 wherein said motor/compressor assembly may rotate about a horizontal axis and further comprising a damper means extending between the motor/compressor assembly and the housing to absorb vibrational energy arising from rotation of the motor/compressor assembly about said axis.

29. An appliance for filling a storage reservoir with gaseous fuel, comprising:
   a) a sealed and thermally conducting casing, the casing being capable of functioning as a heat sink, the casing containing at least:
      i) a multi-stage compressor for compressing the gaseous fuel;
      ii) a variable speed electric motor; and
      iii) a motor controller for controlling the motor, the motor controller being thermally coupled to the casing;
   b) means for providing a cooling and ventilation air flow along an air flow path around the casing;
   c) means for detection of flammable gas positioned in the air flow path; and
   d) a housing for housing items a) to c);
the appliance comprising mounting means for being mounted above ground on an upright mounting support, and further comprising:
   e) a first vibration isolation means mounting the casing in a first vibration isolation relation to the housing; and
   f) a second vibration isolation means positioned for mounting the housing in a second vibration isolation relation to a mounting support.

* * * * *

UNITED STATES PATENT AND TRADEMARK OFFICE
CERTIFICATE OF CORRECTION

| | | |
|---|---|---|
| PATENT NO. | : 7,011,118 B2 | Page 1 of 1 |
| APPLICATION NO. | : 10/265096 | |
| DATED | : March 14, 2006 | |
| INVENTOR(S) | : Anthony Chan et al. | |

It is certified that error appears in the above-identified patent and that said Letters Patent is hereby corrected as shown below:

Column 9, Line 5 (claim 12) The word "around" should be changed to --ground--.

Column 9, Line 14 (claim 13) The word "pasts" should be changed to --past--.

Column 10, Line 5 (claim 19) The word "s aid" should be changed to --said--.

Signed and Sealed this

Tenth Day of June, 2008

JON W. DUDAS
*Director of the United States Patent and Trademark Office*